United States Patent
Bertoldi et al.

(10) Patent No.: US 11,036,940 B2
(45) Date of Patent: Jun. 15, 2021

(54) TRANSLATION SYSTEM AND METHOD

(71) Applicant: MMT SRL, Trento (IT)

(72) Inventors: Nicola Bertoldi, Trento (IT); Davide Caroselli, Trento (IT); M. Amin Farajian, Trento (IT); Marcello Federico, Trento (IT); Matteo Negri, Trento (IT); Marco Trombetti, Trento (IT); Marco Turchi, Trento (IT)

(73) Assignee: MMT SRL, Trento (IT)

( * ) Notice: Subject to any disclaimer, the term of this patent is extended or adjusted under 35 U.S.C. 154(b) by 325 days.

(21) Appl. No.: 16/118,273

(22) Filed: Aug. 30, 2018

(65) Prior Publication Data

US 2020/0073947 A1 Mar. 5, 2020

(51) Int. Cl.
*G06F 40/47* (2020.01)
(52) U.S. Cl.
CPC .................................. *G06F 40/47* (2020.01)
(58) Field of Classification Search
CPC ...... G06F 16/2452; G06F 40/47; G06F 40/51; G06F 40/55; G06F 40/42; G06F 16/8358; G06F 16/24522; G06F 16/3337; G06F 40/40; G06F 40/10
USPC ........................................................ 704/2
See application file for complete search history.

(56) References Cited

U.S. PATENT DOCUMENTS

2011/0307241 A1* 12/2011 Waibel .................. G10L 15/06
704/2

OTHER PUBLICATIONS

Ashish et al., "Attention Is All You Need," 31st Conference on Neural Information Processing Systems (NIPS 2017), Dec. 6, 2017, 15 pages.

(Continued)

*Primary Examiner* — Thierry L Pham
(74) *Attorney, Agent, or Firm* — Haynes and Boone, LLP (57) ABSTRACT

System and method for providing a computer-assisted translation from a source language to a target language, using a generic NMT model and a translation memory. An input text segment is received, and input context information is received. The input context information is indicative of circumstances in which the input text segment is used, the input text segment being in the source language. An estimated translation of the input text segment into the target language is calculated, using a generic neural machine translation "NMT" model for providing a generalised machine translation from the source language to the target language, and a translation memory comprising translation elements; each translation element comprising a source language text segment, a corresponding target language text segment. The estimated translation is provided to a user, for correction by the user. The translation memory is updated by storing the input text segment, the corrected translation, and the input context information, as a new translation element in the translation memory.

19 Claims, 5 Drawing Sheets

(56) References Cited

OTHER PUBLICATIONS

Bandanau et al., "Neural machine translation by jointly learning to align and translate," arXiv preprint arXiv:1409.0473, Sep. 1, 2014, 15 pages.
Chen et al., "A systematic comparison of smoothing techniques for sentence-level BLEU," In Proceedings of the Ninth Workshop on Statistical Machine Translation, WMT@ACL 2014, Jun. 26-27, 2014, Baltimore, Maryland, USA. pp. 362-367.
Cho et al., Learning phrase representations using RNN encoder-decoder for statistical machine translation, CORR abs/1406.1078, Sep. 3, 2014, 15 pages.

* cited by examiner

TRANSLATION SYSTEM AND METHOD

FIELD

The present disclosure provides a system for and a method of calculating an estimated translation from a source language to a target language. In particular, the present disclosure provides a system for and a method capable of iteratively improving the accuracy with which it calculates an estimated translation from a source language to a target language.

BACKGROUND

Many professional translators use Computer Assisted Translation (CAT) tool plugins to help them when translating input source language text documents from the source language to a target language. CAT tools split an input source language text document into a plurality of text segments, and present the segments to a user for translation into a target language. Some CAT tools may store translated source/target language text segment pairs in a memory, and may present a stored target language text segment to a user if it's corresponding source language text segment matches an input source language text segment to be translated. This helps the translator to perform their job. But the chance of a direct match is low, especially when the translator translates documents belonging to a broad range of subject matter fields.

Using a Neural Machine Translation (NMT) model to translate documents from a source language to a target language is known from "Neural Machine Translation by Jointly Learning to Align and Translate", by Dzmitry Bandanau et al.

An NMT algorithm can be trained using training data belonging to a wide range of subject matter fields (e.g. sports, scientific, political, historical, etc.). Training an NMT algorithm in this way produces a generalised NMT model. Generalised NMT models can be used to translate from a source language to a target language in a wide range of subject matter fields. But they are not capable of providing translations that are representative of a specific subject matter field concerned. Translation errors are therefore observed, e.g. in situations where the same source language phrase has a divergent meaning in two different subject matter fields. This problem becomes more pronounced as the difference/drift between subject matter fields increases. The more diverse the range of subject matter fields used to train the generalised NMT model, the more the generalised NMT model is forced to generalise itself, at the expense of translation quality.

Alternatively, an NMT algorithm can be trained using training data belonging to a single subject matter field (e.g. sport). Training an NMT algorithm in this way produces a specialized NMT model. By training multiple NMT algorithms in this way, multiple specialized NMT models can be developed (i.e. one for sport, one scientific, one political, one historical). These multiple NMT models can then be selected as appropriate to provide context-specific translations. But this approach is inefficient, because it requires extensive machine-learning training, and extensive computing resources to implement the multiple NMT models. The approach is also not readily scalable to cover a diverse range of subject matter fields, and it can be difficult to obtain sufficient training data for multiple specialized NMT models to be effectively trained. And if a new subject matter field is suddenly encountered, an entirely new NMT model would have to be trained to cope with this new field.

There is therefore a need for an NMT approach, which addresses the above problems.

SUMMARY

At its most general, the present disclosure provides a system for and a method of calculating an estimated translation from a source language to a target language; using a generic model (e.g. generic Neural Machine Translation "NMT" model), and a translation memory for modifying the generic model (e.g. generic Neural Machine Translation "NMT" model), wherein the translation memory is updated when a user corrects the estimated translation.

The use of a translation memory for modifying the generic model (e.g. generic Neural Machine Translation "NMT" model) enables accurate, context-specific translations to be provided. Furthermore, by updating the translation memory when a user corrects an estimated translation, the translation accuracy of the system/method progressively improves, i.e. each time an estimated translation is corrected.

In a first aspect there is provided a system for calculating an estimated translation from a source language to a target language, the system comprising: a generic model (e.g. generic Neural Machine Translation "NMT" model) for providing a generalised machine translation from the source language to the target language; and a translation memory comprising translation elements for modifying the generic NMT model, each translation element comprising a source language text segment, a corresponding target language text segment, and corresponding source context information indicative of circumstances in which the source text segment is used; the system configured to: receive an input text segment and input context information indicative of circumstances in which the input text segment is used, the input text segment being in the source language; calculate an estimated translation of the input text segment into the target language using the generic NMT model and the translation memory; provide the estimated translation to a user, for correction by the user; and store the input text segment, the corrected translation, and the input context information, as a new translation element in the translation memory, thereby updating the translation memory.

Accordingly, each time an estimated translation is corrected by a user, the translation memory is updated with a new translation element (i.e. a new translation element is stored in the translation memory). Thus, the size of the translation memory increases as translations are provided. And by increasing the size of the translation memory, the accuracy with which translations are estimated is improved. In short, the translation accuracy of the system is progressively/iteratively improved.

As disclosed herein, a corresponding target language text segment is defined as a text segment which is a translation of a source language text segment into the target language.

A generic NMT model is defined herein as an NMT model (i.e. a translation model that uses neural network-based machine learning, or that is built using neural network-based machine learning) that is generalised to cover a wide-range of contexts. For example, it may be generalised to cover a wide range of subject-matter fields (e.g. sports, scientific, political, historical, etc.). Such a generalised NMT model can lead to translation errors in the estimated translation, in situations where the correct translation of a source text segment is context-dependent. By using the translation memory in addition to the generic NMT model, such translation errors can be reduced or even substantially eliminated. And by increasing the size of the translation memory as corrections are made by a user, the ability for the translation memory to reduce translation errors is iteratively improved.

NMT models comprise parameters for use in translating from the source language to the target language. It is the parameters that determine the target language output. By modifying the parameters, the target language output changes.

The input text segment may be stored as a source text segment; the corrected translation may be stored as a target text segment; and the input context information may be stored as source context information. Accordingly, the new translation element may be indexed in the same way as the existing translation elements in the translation memory.

The user may be a human translator. The user may provide a corrected translation (e.g. a correction of the estimated translation), if there is an error in the estimated translation. The human translator may be employed to correct the estimated translation. The user may interact with the system from a user device.

At least some of the source/input context information may be indicative of one or more of dialect, discourse, lexicon, and subject matter of the source/input text segment (or a text document to which the source/input text segment belongs).

At least some of the source/input context information may comprise metadata indicative of one or more of dialect, discourse, lexicon, and subject matter of the source/input text segment (or a text document to which the source/input text segment belongs).

The source/input context information may be a vector. Each component of the vector may contain a different element of source/input context information. For example, the vector may include two or more of the following elements: subject matter (e.g. subject matter field) of the source/input text segment; an author of an input/source language text document to which the source/input text segment belongs; a company that employs the author; and a user from which the translation element originated.

The translation memory may include translation elements used to train the generic NMT model. The translation memory may also include translation elements stored from (e.g. originating from) the user (or users). The translation elements may be aggregated/grouped according to their context information. For example, translation elements having the same context information may be grouped/aggregated into a single translation memory group within the translation memory.

A user may translate an entire input source language text document in a single user translation session, e.g. using a CAT tool plugin. As discussed in more detail later, the input source language text document may be split into input text segments. The input text segments from a single input source language text document may then be translated individually/sequentially using the system, e.g. in a single user translation session.

Multiple users may use the system. The translation memory may include translation elements stored from (e.g. originating from) multiple users. The translation elements originating from user(s) of the system may be grouped/aggregated into translation memory groups within the translation memory. The translation memory may thus comprise a plurality of translation memory groups, each group comprising a plurality of translation elements. Each translation memory group may contain translation elements originating from a single user. The translation elements in a single translation memory group may each have the same source context information, i.e. may share the same source context information. In other words, the translation elements may be indexed into translation memory groups within the translation memory, according to their source context information.

Each translation element in the same group may be represented by the same context information vector. In other words, the translation elements may be indexed into translation memory groups according to their context information vector.

Calculating the estimated translation may comprise: selecting one or more translation element(s) from the translation memory, based on a match between the input text segment and the source language text segment of each of the one or more selected translation element(s) fulfilling a first predetermined criterion; and optionally further based on a match between the input context information and the source context information of the selected translation element(s) fulfilling a second predetermined criterion; generating an adapted NMT model by modifying the generic NMT model using the one or more selected translation element(s); and calculating the estimated translation of the input text segment into the target language using the adapted NMT model.

Calculating the estimated translation may also include searching for a translation memory group (or groups) for which a numerical match between the input context information (or the input context information vector) and the source context information (or source context information vector) fulfils the second predetermined criterion.

Estimating the translation may also include searching for a translation element (or translation elements) for which a match between the input text segment and the source text segment fulfils the first predetermined criterion.

The selecting may then comprise selecting one or more translation element(s) from the translation memory for which an aggregation of the first predetermined criterion and the second predetermined criterion fulfils a third predetermined criterion. The aggregation may be configured to give higher priority to the second predetermined criterion. In other examples, the aggregation may be configured to give higher priority to the first predetermined criterion. In yet other examples, the aggregation may give equal priority to the first and second predetermined criterion.

Generating the adapted NMT model may comprise modifying parameters of the generic NMT model using the one or more selected translation element(s). Modifying the parameters of the generic NMT model may comprise applying an NMT training procedure to the generic NMT model. In effect, the generic model may be re-trained, by applying known neural network machine learning techniques using the selected training elements, in order to modify the parameters of the general NMT model to arrive at the adapted NMT model. Accordingly, the target language output of the adapted NMT model is adapted, i.e. according to the specific context of the source text segment.

The modification step may be done according to one or more hyperparameter. The hyperparameter(s) may define details of the training procedure used to modify the generic NMT model. In cases where the predetermined criterion (e.g. the third predetermined criterion) indicates a strong match, then the hyperparameters will be modified to increase the extent of the modification.

The hyperparameter(s) may include a number of iterations performed in the modification step and/or a learning rate. The number of iterations performed in the modification step may be proportional to a level of match indicated by the predetermined criterion (e.g. the third predetermined criterion). The learning rate may be proportional to a level of match indicated by the predetermined criterion (e.g. the third predetermined criterion). For example, in cases where the predetermined criterion (e.g. the third predetermined criterion) indicates a 60% match, 3 iterations may be performed. In cases where the predetermined criterion (e.g. the third predetermined criterion) indicates an 80% match, 5 iterations may be performed. Accordingly, the modification may be more aggressive in cases where very similar training elements are found.

The system may further comprise: a server comprising a processor and server storage device; and a user device in communication with the server, from which the user interacts with the system; wherein the server storage device has stored thereon the generic NMT model and the translation memory.

The processor may be a central processing unit (CPU), e.g. a microprocessor unit. It may comprise a single integrated circuit (IC) unit, or multiple IC units.

The server storage device may comprise be a volatile storage device (e.g. Static Random Access Memory, SRAM, or Dynamic Random Access Memory, or DRAM). Alternatively, the server storage device may comprise a non-volatile storage device (e.g. magnetic hard disc drive, Flash memory, F-RAM, or MRAM). The server storage device may comprise multiple volatile and/or non-volatile storage devices.

The user device may be an input device connected directly to the server. For example, the user device may comprise a computer display, a keyboard, and a computer mouse connected directly to the server.

Alternatively, the user device may be connected to the server via a Local Area Network (LAN) connection, e.g. by a wired ethernet connection, a wireless (WiFi) connection, etc.

Alternatively, the user device may be connected to the server via a Wide Area Network (WAN) connection, e.g. over a telephone line, broadband line, fiber optic connection, 4G network, etc. The user device and server may communicate via a cloud computing environment.

The user device may be a desktop Personal Computer (PC), laptop, tablet PC, mobile phone device, etc.

Accordingly, the translation memory at the server may be updated by multiple user devices in communication with the server. Furthermore, the translation memory may be leveraged for providing estimated translations to multiple user devices. Estimated translation quality/accuracy may thereby be improved for multiple user devices.

The server storage device is 'internal' to the server. The server may be configured so that the user device cannot directly communicate with the server device. In other words, the user device may only communicate indirectly with the server storage device via the processor.

The system may be configured for one-way communication of translation elements from the user device to the server. The server (processor) may only return an estimated translation to the user device, i.e. may be configured not to send translation elements to the user device. As such, the translation elements of the server translation memory are not sent to the user device.

The user device may be configured to receive the input text segment, extract the input context information from the input text segment or from an input document to which the input text segment belongs, and forward the input text segment and input context information to the server; the processor is configured to forward the estimated translation to the user device; after the estimated translation has been corrected by the user, the user device is further configured to forward the corrected translation to the server; and the processor is configured to store the input text segment, the corrected translation, and the input context information, as a new translation element in the translation memory of the server storage device.

In practice, a user may initiate the translation process by providing an input source language text document to be translated to the user device, e.g. by scanning the input source language text document into the user device, or by downloading the input source language text document, e.g. from an email or from a website. The user device may then split the input source language text document into a series of input text segments. The input text segments may be between 1 and 50 words long. In examples, the input text segment may be the length of a sentence.

The input text segments may be provided individually to the server, e.g. one-at-a-time. They may be provided to the server in the order that they appear in the input source language text document.

For each text segment, the user device may then extract the context information from an input text window associated with the input text segment. The input text window may comprise the input text segment. The input text window may further comprise text either side of the input text segment. The input text window may be between 2 and 20 text segments long, e.g. between 5 and 10 segments long. In some examples, the window may comprise the entire input source language text document.

Extracting context information may comprise removing all common words (e.g. articles and prepositions) from the input text window. The context information may comprise all remaining words from the input text window.

The match between the input context information and the source context information may represent a number of words shared between the input context information and the source context information. Alternatively, the match between the input context information and the source context information may be a percentage of words shared between the input context information and the source context information.

The user device may include a user storage device having stored thereon a translation sub-memory associated with the user device, the translation sub-memory comprising translation elements. The translation sub-memory may be sorted/split into translation sub-memory groups. Each translation sub-memory group may comprise translation elements from a single user translation session, i.e. translation elements corresponding to a single input text document that has previously been translated.

Each translation sub-memory group may have a corresponding translation memory group in the translation memory at the server. The translation sub-memory group may contain the same translation elements as the corresponding translation memory group. The/each new translation element may be stored in translation sub-memory groups stored at the user device, that were leveraged to calculate the estimated translation; and may further be stored in translation memory groups corresponding to the translation sub-memory groups leveraged to calculate the estimated translation.

Translation memory groups in the server that do not have a corresponding translation memory sub-group associated with the user device may also be leveraged. But the/each new translation element will not be stored in these translation memory groups. For example, a translation memory group associated with a different user device may be leveraged, but it will not be updated with the new translation element.

Herein, a group (in the translation memory or the translation sub-memory) is 'leveraged' at the calculation step, if it contains a translation element selected for use in the calculation step. Each user may only leverage its own translation sub-memory groups. In other words, a user device cannot access translation sub-memories of other devices.

The user storage device may comprise be a volatile storage device (e.g. Static Random Access Memory, SRAM, or Dynamic Random Access Memory, or DRAM). Alternatively, the user storage device may comprise a non-volatile storage device (e.g. magnetic hard disc drive, Flash memory, F-RAM, or MRAM). The user storage device may comprise multiple volatile and/or non-volatile storage devices.

The translation sub-memory of the user device may be continually updated with new translation elements generated at the user device. The translation sub-memory of the user device may further comprise pre-existing/pre-stored translation memory.

As such, in cases where there is a plurality of user devices, at least one of the plurality of user devices may have a translation sub-memory that is unique from the other user devices.

The user device may be configured to forward translation elements of the translation sub-memory to the server; and the processor may be configured to update the translation memory on the server storage device with translation elements of the translation sub-memory received from the user device.

The user device may be able to assign at least a portion of the translation sub-memory stored thereon as private. This private portion of the translation sub-memory may then be used to update the translation memory on the server storage device, but may labelled as user-specific translation memory. This user-specific translation memory may only be used by the server when providing estimated translations to that same user device. Accordingly, where a user device has a translation sub-memory containing sensitive information, that sensitive information can be entirely privatised. Other user devices would not have access to this user-specific translation memory.

The system may comprise a plurality of user devices, each in communication with the server; wherein each user device is configured to forward a respective input text segment, corresponding input context information and corresponding corrected translation to the server; and the processor is configured to forward a respective estimated translation to each user device.

In a second aspect there is provided a method of calculating an estimated translation from a source language to a target language, the method comprising: receiving an input text segment and input context information indicative of circumstances in which the input text segment is used, the input text segment being in the source language; calculating an estimated translation of the input text segment into the target language using a generic model (e.g. generic Neural Machine Translation "NMT" model) for providing a generalised machine translation from the source language to the target language, and a translation memory comprising translation elements for modifying the generic NMT model; each translation element comprising a source language text segment, a corresponding target language text segment, and corresponding source context information indicative of circumstances in which the source text segment is used; providing the estimated translation to a user, for correction by the user; and updating the translation memory by storing the input text segment, the corrected translation, and the input context information, as a new translation element in the translation memory.

Accordingly, each time an estimated translation is corrected by a user, the translation memory is updated with a new translation element. Thus, the size of the translation memory increases as translations are provided. And by increasing the size of the translation memory, the accuracy with which translations are estimated is improved. In short, the translation accuracy of the system is iteratively improved.

The generic NMT model is defined herein as an NMT model that is generalised to cover a wide-range of contexts. For example, it may be generalised to cover a wide range of subject-matters (e.g. sports, scientific, political, historical, etc.). Such a generalised NMT model can lead to translation errors in the estimated translation, in situations where the correct translation of a source text segment is context-dependent. By using a translation memory in addition to the generic NMT model, such translation errors can be reduced or even substantially eliminated. And by increasing the size of the translation memory as translations are provided, the ability for the translation memory to reduce translation errors is iteratively improved.

NMT models comprise parameters for use in translating from the source language to the target language. It is the parameters that determine the target language output. By modifying the parameters, the target language output changes.

The translation memory may include translation elements used to train the generic NMT model.

The input text segment may be stored as a source text segment; the corrected translation may be stored as a target text segment; and the input context information may be stored as source context information. Accordingly, the new translation element may be indexed in the same way as the existing translation elements in the translation memory.

At least some of the source/input context information may be indicative of one or more of dialect, discourse, lexicon, and subject matter of the source/input text segment (or a text document to which the source/input text segment belongs).

At least some of the source/input context information may comprise metadata indicative of one or more of dialect, discourse, lexicon, and subject matter of the source/input text segment (or a text document to which the source/input text segment belongs).

The source/input context information may be a vector. Each component of the vector may contain a different element of source/input context information. For example, the vector may include two or more of the following elements: subject matter (e.g. subject matter field) of the source/input text segment; an author of an input/source language text document to which the source/input text segment belongs; a company that employs the author; and a user from which the translation element originated.

The translation memory may include translation elements used to train the generic NMT model. The translation memory may also include translation elements stored from (e.g. originating from) the user (or users). The translation elements may be aggregated/grouped according to their context information. For example, translation elements having the same context information may be grouped/aggregated into a single translation memory group within the translation memory.

A user may translate an entire input source language text document in a single user translation session, e.g. using a CAT tool plugin. As discussed in more detail later, the input source language text document may be split into input text segments. The input text segments from a single input source language text document may then be translated individually/sequentially using the system, e.g. in a single user translation session.

Multiple users may use the system. The translation memory may include translation elements stored from (e.g. originating from) multiple users. The translation elements originating from user(s) of the system may be grouped/aggregated into translation memory groups within the translation memory. The translation memory may thus comprise a plurality of translation memory groups, each group comprising a plurality of translation elements. Each translation memory group may contain translation elements originating from a single user. The translation elements in a single translation memory group may each have the same source context information, i.e. may share the same source context information. In other words, the translation elements may be indexed into translation memory groups within the translation memory, according to their source context information.

Each translation element in the same group may then be represented by a group context information vector. In other words, the translation elements may be indexed into translation memory groups according to their context information vector.

Calculating the estimated translation may comprise: selecting one or more translation element(s) from the translation memory, based on a match between the input text segment and the source language text segment of each of the one or more selected translation element(s) fulfilling a first predetermined criterion; and optionally further based a on match between the input context information and the source context information of the selected translation element(s) fulfilling a second predetermined criterion; generating an adapted NMT model by modifying the generic NMT model using the one or more selected translation element(s); and calculating the estimated translation of the input text segment into the target language using the adapted NMT model.

Calculating the estimated translation may also include searching for a translation memory group (or groups) for which a numerical match between the input context information (or the input context information vector) and the source context information (or source context information vector) fulfils the second predetermined criterion.

Estimating the translation may also include searching for a translation element (or translation elements) for which a match between the input text segment and the source text segment fulfils the first predetermined criterion.

The selecting may then comprise selecting one or more translation element(s) from the translation memory for which an aggregation of the first predetermined criterion and the second predetermined criterion fulfils a third predetermined criterion. The aggregation may be configured to give higher priority to the second predetermined criterion. In other examples, the aggregation may be configured to give higher priority to the first predetermined criterion. In yet other examples, the aggregation may give equal priority to the first and second predetermined criterion.

Generating the adapted NMT model may comprise modifying parameters of the generic NMT model using the one or more selected translation element(s). Modifying the parameters of the generic NMT model may comprise applying an NMT training procedure to the generic NMT model. In effect, the generic model may be re-trained, by applying known neural network machine learning techniques using the selected training elements, in order to modify the parameters of the generic NMT model to arrive at the adapted NMT model. Accordingly, the target language output of the adapted NMT model is adapted, i.e. according to the specific context of the source text segment.

The modification step may be done according to one or more hyperparameter. The hyperparameter(s) may define details of the training procedure used to modify the generic NMT model. In cases where the predetermined criterion (e.g. the third predetermined criterion) indicates a strong match, then the hyperparameters will be modified to increase the extent of the modification.

The hyperparameter(s) may include a number of iterations performed in the modification step and/or a learning rate. The number of iterations performed in the modification step may be proportional to a level of match indicated by the predetermined criterion (e.g. the third predetermined criterion). The learning rate may be proportional to a level of match indicated by the predetermined criterion (e.g. the third predetermined criterion). For example, in cases where the predetermined criterion (e.g. the third predetermined criterion) indicates a 60% match, 3 iterations may be performed. In cases where the predetermined criterion (e.g. the third predetermined criterion) indicates an 80% match, 5 iterations may be performed. Accordingly, the modification may be more aggressive in cases where very similar training elements are found.

An input source language text document may be split into a plurality of input text segments. The input text segment may be one of a series of input text segments taken from the input source language text document. Each input text segment may be between 1 and 50 words long, e.g. between 10 and 20 words long. In examples, the input text segment may be the length of a sentence.

The input text segment, input context information and corrected translation may be received from a user device associated with the user; the input context information extracted, by the user device, from the input text segment or from an input document to which the input text segment belongs.

The user device may extract the context information from an input text window associated with the input text segment. The input text window may comprise the input text segment. The input text window may further comprise text either side of the input text segment. The input text window may be between 2 and 20 text segments long, e.g. between 5 and 10 segments long.

Extracting context information may comprise removing all common words (e.g. articles and prepositions) from the input text window. The context information may comprise all remaining words from the input text window.

The match between the input context information and the source context information may represent a number of words shared between the input context information and the source context information. Alternatively, the match between the input context information and the source context information may be a percentage of words shared between the input context information and the source context information.

The translation memory may be further updated using translation elements from a translation sub-memory associated with a user device, the user device associated with the user. The translation sub-memory may be sorted into translation sub-memory groups, where each translation sub-memory group comprises translation elements from a single user translation session, i.e. translation elements corresponding to a single input text document that has previously been translated.

Each translation sub-memory group may have a corresponding translation memory group in the translation memory. The translation sub-memory group may contain the same translation elements as the corresponding translation memory group. The/each new translation element may be stored in translation sub-memory groups stored at the user, that were leveraged to calculate the estimated translation; and may further be stored in translation memory groups corresponding to the translation sub-memory groups leveraged to calculate the estimated translation.

Translation memory groups that do not have a corresponding translation memory sub-group associated with the user may also be leveraged. But the/each new translation element will not be stored in these translation memory groups. For example, a translation memory group associated with a different user may be leveraged, but it will not be updated with the new translation element.

The user device may be able to assign at least a portion of the translation sub-memory as private. This private portion of the translation sub-memory may then be used to update the translation memory, but may only be used when providing estimated translations to that same user device. Accordingly, where a user device has a translation sub-memory containing sensitive information, that sensitive information can be entirely privatised.

In a third aspect there is provided a computer-readable storage medium comprising instructions which, when executed by a computer, cause the computer to carry out the method according to the second aspect.

The computer-readable storage medium may comprise a volatile storage device (e.g. Static Random Access Memory, SRAM, or Dynamic Random Access Memory, or DRAM). Alternatively, the computer-readable storage medium may comprise a non-volatile storage device (e.g. Compact Disc (CD), Blu-ray Disc (BD), magnetic hard disc drive, Flash drive, F-RAM, or MRAM).

BRIEF DESCRIPTION OF THE FIGURES

Example embodiments will now be described with reference to the accompanying figures, in which.

DETAILED DESCRIPTION

Many professional translators use CAT tool plugins to help them when translating input source language documents from the source language to a target language. Herein, the expressions "user" and "translator" will be used interchangeably. Thus, in the context of the present disclosure, a "user" may be a professional translator.

A CAT tool is a computer plugin that can be easily installed on a user's computer (e.g. over the internet, from a CD, or from a Flash drive). It may be installed, for example, on a user's personal computer (PC), mobile phone, laptop, or tablet. The role of a CAT tool is to split an input source language document into a series of input source language text segments, and to present the input source language segments to the user, in sequential order. The user then translates the input source language text segments into the target language (i.e. into target language text segments). By presenting the input source language text in segments, rather than as an entire document, the translator can perform their job more efficiently.

In cases where the input source language document is a text document, it could be a PDF document or even a scan, e.g. of a newspaper article, a scientific journal, or a historic document. In such examples, the document may be formatted with images etc., which could be a distraction to the translator. CAT tools, on the other hand, only present the text segments themselves—and not the overall document or images contained in the document—thus removing any distractions, and improving the user's efficiency when translating the document.

The input source language document is typically a text document, but it could be for example alternatively be an audio document to be converted into a text document using speech recognition techniques. The user would then translate the converted input source language text document into the target language, as outlined above.

As the user translates the input source language text segments into the target language, the CAT tool saves the source language text segments and corresponding translated target language text segments in an internal memory, as source/target language translation pairs. An internal database of 'translated pairs' is therefore maintained by the CAT tool.

The present disclosure leverages such CAT tools to improve the quality, accuracy and reliability of translation estimates calculated by Neural Machine Translation (NMT).

Figure 1:
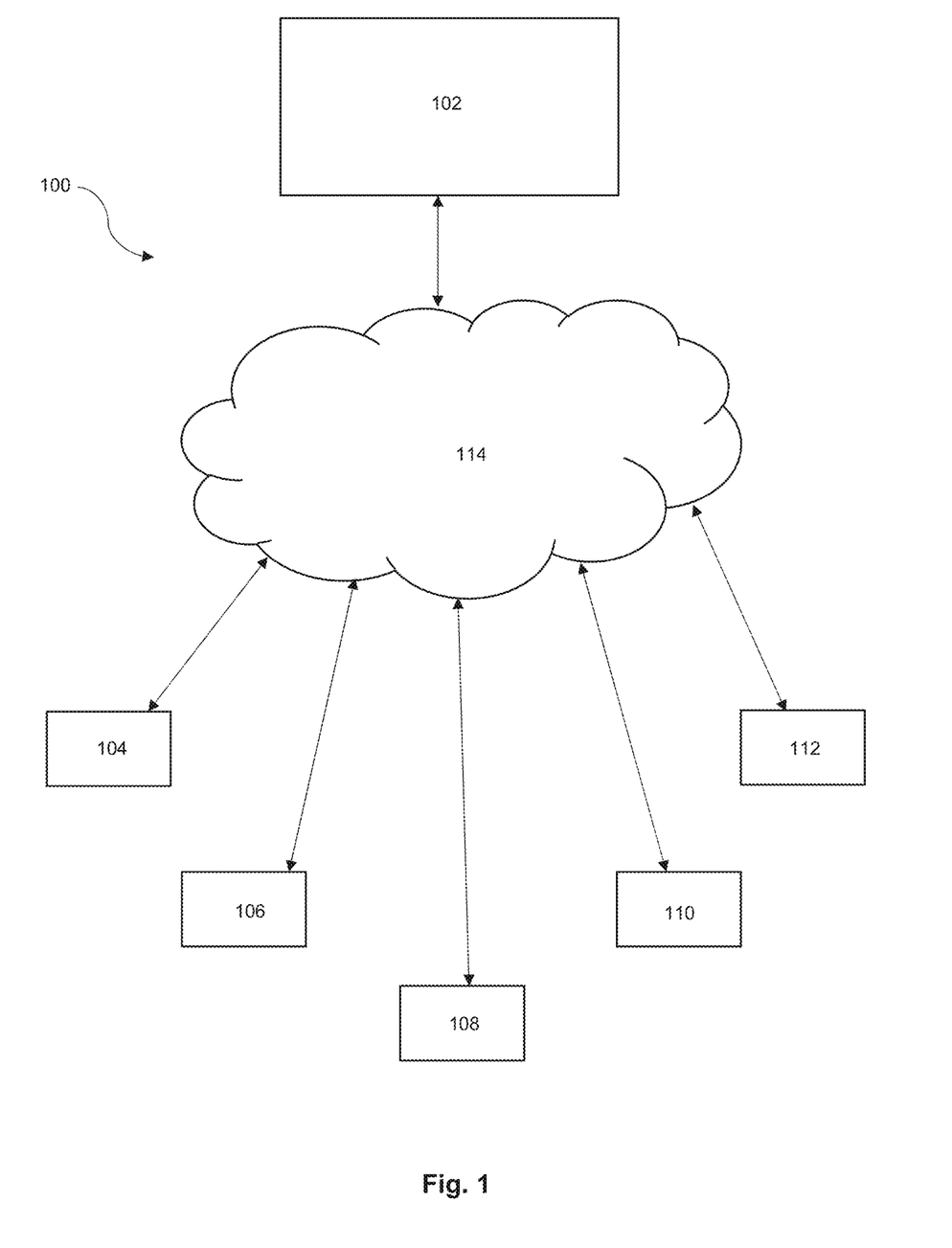
FIG. 1 is a simplified schematic illustration of a system having a server and user devices, according to the present disclosure.

FIG. 1 is a simplified schematic illustration of an example system 100 according to the present disclosure.

The system comprises a server 102, connected to user devices 104, 106, 108, 110, 112 by a networked internet connection 114. Each user device 104, 106, 108, 110, 112 has a CAT tool plugin. The server 102 is a general-purpose computer system connected to the internet. The user device is a personal computer connected to the internet. The user device could alternatively be a mobile device. The user device 104 could of course be any device capable of connecting to the internet and capable of performing the steps outlined in FIG. 3.

A user initiates a user translation session, by providing an input source language text document to user device 104. Initiation of the user translation session includes the CAT tool of the user device initiating a user translation session with the server 102. The CAT tool stored on the user device 104 splits the input source language text document into a plurality of input source language text segments, each of which is a single sentence long (i.e. bounded at each end by a full-stop). For each input source language text segment, input context information metadata is extracted. The extraction performed by the user device 104 is explained in more detail in FIG. 3.

The input source language text segments and corresponding input context information metadata are then sent to server 102 over internet connection 114. They may be sent in sequential order (i.e. starting with the first input source language text segment to appear in the input source language text document, and the corresponding input context information metadata), if the user selects to perform translation in a sequential order. However, any other order may be selected by the user, depending on the preferences of the user.

Server 102 includes a generic NMT model for providing generalised machine translations from the source language to the target language. Server 102 also includes a translation memory comprising a plurality of translation elements for modifying the generic NMT model. Each translation element includes a source language text segment, a corresponding target language text segment (i.e. a target language text segment that is a correct translation of the source language text segment into the target language), and corresponding source context information metadata (i.e. metadata indicative of the subject matter field to which the source text segment in the translation element belongs, or the subject matter field in which the source text segment is/was used). The translation memory includes translation elements used to train the generic NMT model, and translation elements previously received from user devices in other (previous) translation sessions. The generic NMT model and translation memory are explained in more detail later on.

In some examples, the server may include multiple NMT models. For example, it may include one NMT model for each set of languages supported by the methods/systems disclosed herein. For example, it may include one of more of: a French/English generic NMT model; an Italian/English generic NMT model; a French/Italian generic NMT model, etc. It may also include one or more multilingual generic NMT model, e.g. a French/Spanish/Portuguese generic NMT model, and/or an English/Spanish/Catalan generic NMT model. Such a multilingual generic NMT model may be capable of translating from English to both Spanish and Catalan, for example. As the skilled person will appreciate, any number of generic NMT models may be used. For simplicity of description, in the following only a single generic NMT model is referred to. But as the skilled person will appreciate, the systems and methods disclosed herein could be adapted to accommodate any number of generic NMT models.

Server 102 receives the input source language text document and corresponding input context information metadata over the internet connection 114, and then searches in the translation memory stored at the server for one or more translation element that matches the input context information metadata by a predefined amount. Once at least one matching translation element has been found, that translation element is used to modify the parameters of the generic NMT model, thereby adapting the parameters of the NMT model, so that the NMT model is capable of calculating an estimated translation of the input source language text segment into the target language, that is accurate to the subject matter field and/or context of the input source language text document. The adapted NMT model is then used to calculate an estimated translation of the input source language text segment into the target language. This estimated translation is then sent back to the user device 104 over the connection 114, and the parameters of the NMT model are then reset—thus returning to the generic NMT model, ready for a new input source language text segment to be received and translated. More on the storing, searching, modification and estimation steps later on.

The user device 104 then receives the estimated translation. A user of the user device is presented with the input source language text segment, and the corresponding estimated translation, and corrects the estimated translation if necessary. Hence, the system helps translators to quickly translate the text segment.

Finally, the user device 104 generates a new translation element comprising the input source language text segment as the source language text segment of the translation element; the corrected translation as the target language text segment of the translation element; and the input context information metadata as the source language text segment of the translation element. This new translation element is then stored as a translation element in a translation sub-memory in the user device, and is also sent to the server 102, over connection 114, for storage as a new translation element in the translation memory of the server.

This same process is performed for each input source language text segment in the input source language text document. Accordingly, a plurality of translation elements corresponding to the input source language text document are created. These translation elements are stored/indexed as groups of translation elements in the translation sub-memory (referred to interchangeably herein as translation sub-memory groups), and as groups of translation elements in the translation memory of the server (referred to interchangeably herein as translation memory groups). In particular, a new translation element will be added to all those translation sub-memory groups that were leveraged when calculating the estimated translation, e.g. all those groups of translation elements in the sub-memory of the user device from which translation elements were selected when calculating the estimated translation; and corresponding translation memory groups in the server. Through this approach, the translation memory (and groups thereof) continually grow in size.

For example, translation elements from translation memory groups A, B and C in the translation memory at the server may be used when calculating the estimated translation. If translation groups A and B have corresponding translation sub-memory groups A' and B' in the user device, then the new translation element will be stored in groups A, A', B and B'.

When a new user device (e.g. user device 106) is connected to the server 102 via internet connection 114, a translation sub-memory stored on the user device 106 will be used to update the translation memory at the server, with new translation elements (e.g. new groups of translation elements) not already present in the translation memory of the server. Accordingly, the translation memory at the server is kept up-to-date with the translation sub-memories of all user devices connected to the server.

Moreover, the server 102 acts as a central repository for translation elements from a plurality of user devices, and the translation memory of the server 102 is continually updated as new translation elements are continually added by user devices. The size of the translation memory therefore constantly increases, such that the chances of finding multiple matching translation elements continually increases. Accordingly, the ability to fine-tune the hyperparameters of the NMT model to produce the adapted NMT model improves, such that the accuracy and reliability of the estimated translations calculated by the server also improves.

Figure 2:
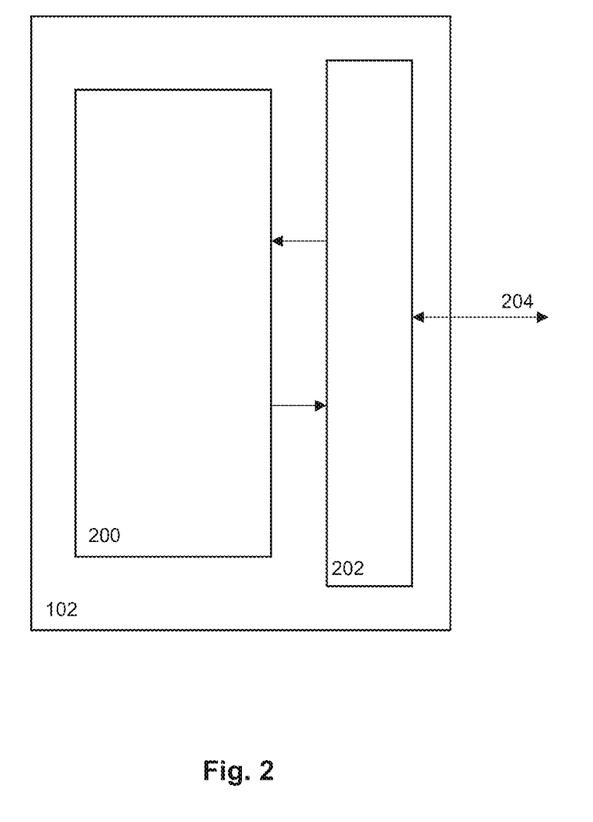
FIG. 2 is a simplified schematic illustration of the architecture of the server from FIG. 1.

FIG. 2 shows a simplified example layout of a processor (processor block) 202, and a server storage device 200 within the server 102. Processor 202 includes internal computational RAM memory (not shown) to enable it to perform computational tasks, and also includes a communication interface (not shown) for communication with the user devices.

All information travelling to/from the user devices (along signal pathway 204) is received/sent by the communication interface of the processor block 202. User devices therefore do not have direct access to the information in the server storage device 200. In the example of FIG. 2, the processor block 202 and the server storage device 200 are housed within a single server unit. However, as the skilled person will appreciate, the processor block 202 and the server storage device may be housed within separate server units. They may even be located at completely different geographic locations from each other, and communicate e.g. over a LAN or WAN connection.

Stored on the server storage device 200 are the generic NMT model, and the translation memory.

When the processor block 202 receives an input source language text segment and corresponding input context information from a user device, it then queries the server 102 for matching translation element(s). If a match (or matches) is (are) found, then the processor is informed of the match.

The processor then uses the matching translation element(s) to modify the generic NMT model, thereby arriving at an adapted NMT model, and uses this NMT model to calculate an estimated translation of the input source language text segment into the target language. The estimated translation element is then sent to the user device from which the input source language text segment was received. The translation element(s) themselves are not sent to the user device.

Figure 3:
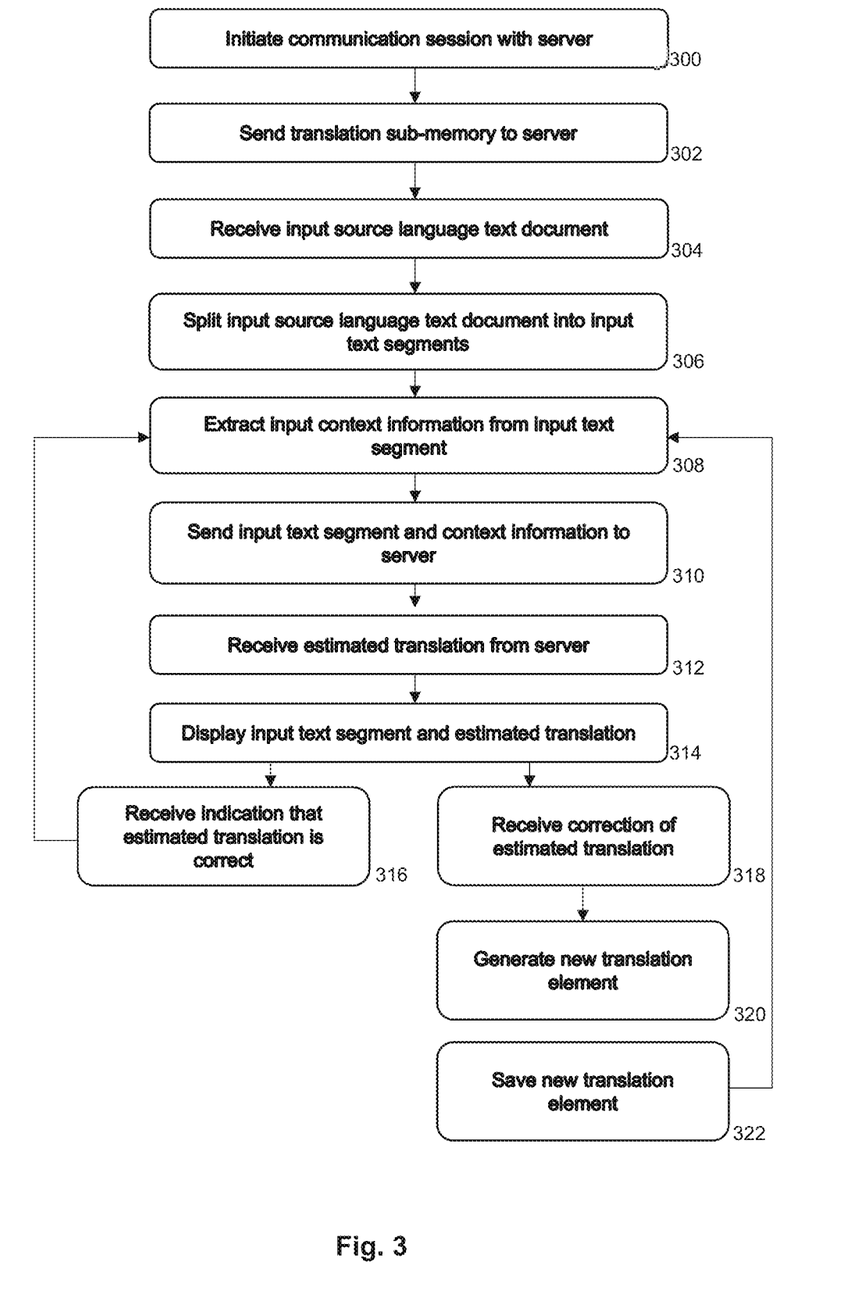
FIG. 3 is a flow-chart showing steps performed by any user device from FIG. 1.

FIG. 3 is a flow chart showing processing steps performed by user device 104 of FIG. 1. The steps shown in FIG. 3 may be implemented by a modified CAT tool plugin installed on a memory device of the user device 104, and executed by a processor of the user device. The modified CAT tool plugin may be installed on the memory device of the user device 104 from a CD, the internet, or a Flash drive, etc.

At step 300, user device 104 initiates a user translation session with the server 102.

At step 302, the user device 104 sends its translation sub-memory to the server 102.

At step 304, user device 104 receives an input source language text document.

At step 306, user device 104 splits the input source language text document into input source language text segments, each segment being one sentence in length.

At step 308, the user device 104 extracts input context information metadata from the first input source language text segment (i.e. the first segment to appear in the input source language text document). This extraction step is performed by selecting an input text window of 2-10 source language text segments including the words of the first input source language text segment, from the input text document. All articles and prepositions are removed from the window. The input context information metadata comprises the remaining words from the window.

At step 310, the user device 104 sends the first input source language text segment and the extracted input context information metadata to the server 102.

At step 312, the user device 104 receives an estimated translation of the first input source language text segment into the target language from the server 102.

At step 314, the user device 104 displays the first input source language text segment and the estimated translation of the first input source language text segment into the target language to a user, for correction by the user.

At step 316, the user device 104 receives an indication that the estimated translation is correct. The user device then repeats steps 306-312 for the next (second or subsequent) input source language text segment, until the entire input source language text document has been translated.

At step 318, the user device 104 receives a correction of the estimated translation of the first input source language text segment into the target language, from a user.

At step 320, the user device 104 generates a new translation element comprising the input source language text segment as the source language text segment of the translation element; the corrected translation as the target language text segment of the translation element; and the input context information metadata as the source language text segment of the translation element.

At 322, the user device 104 saves a copy of the new translation element to a translation sub-memory at the user device, and forwards a copy of the new translation element to the server 102. The user device 104 then repeats steps 306-312 for the next (second or subsequent) input source language text segment, until the entire input source language text document has been translated.

The new translation elements created in the user translation session are stored in each translation sub-memory group of the user device that was leveraged when calculating the estimated translation. The new translation elements are also sent to the server, for storage in all corresponding translation memory groups at the server storage device. In practice, the translation elements are stored as they are created—i.e. one-at-a time. The translation memory at the server is thereby incrementally grown as translation elements are created.

In the unlikely event that no existing translation sub-memory groups are leveraged for the purpose of calculating estimated translations, then new groups can be created in both the translation sub-memory of the user device, and the translation memory of the server.

Figure 4:
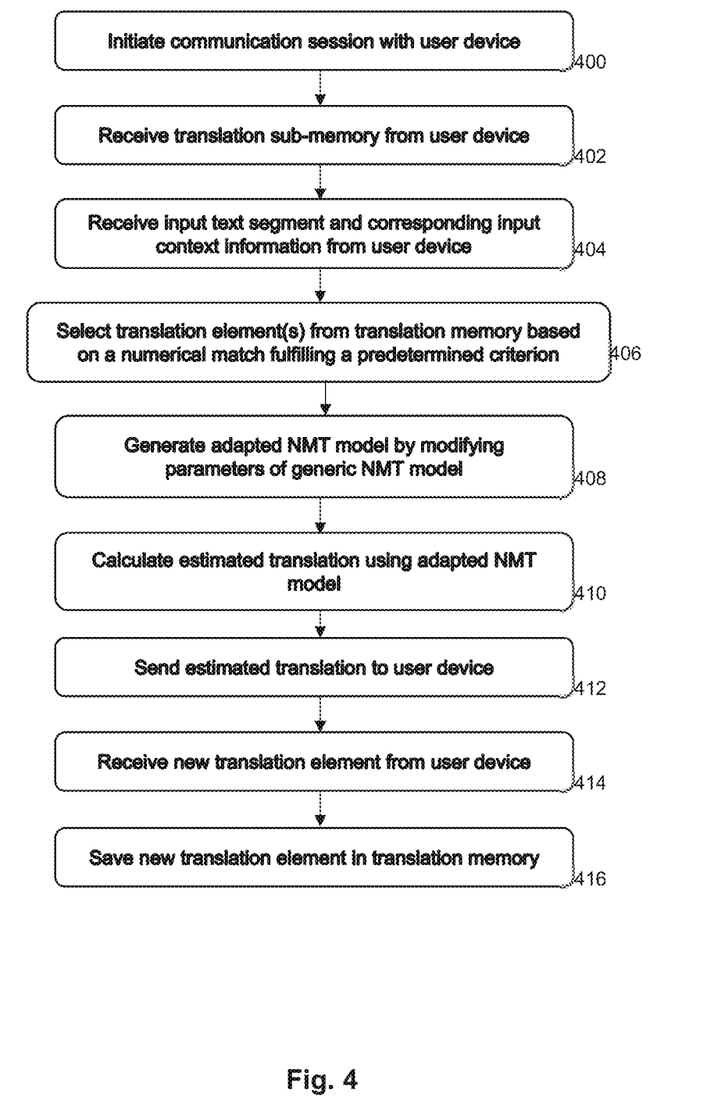
FIG. 4 is a flow chart showing a method implemented by the server of FIG. 1 and/or FIG. 2.

FIG. 4 is a flow chart showing processing steps performed by the server 102 of FIGS. 1 and 2. The steps shown in FIG. 4 are be implemented by software installed on the server storage device 200 of the server 102, and executed by the processor 202 of the server 102. The software may be installed on the server storage device 200 from a CD, the internet, or a Flash drive, etc. As explained in FIG. 2, the processor 202 passes information between the user device 104 and the server storage device 200, and further prevents the user device 104 from directly accessing the contents of the server storage device. For clarity of explanation however, the processing steps are described as being performed by the server 102 in the following description, and explicit reference to the processor 200 and the server storage device 200 is omitted. As the skilled person will understand, the processing steps are actually performed by processor 202.

At step 400 server 102 initiates a communication session with the user device 104.

At step 402 the server 102 receives the translation sub-memory from the user device 104, and saves any translation sub-memory groups not already present/replicated in the translation memory as new translation memory groups in the translation memory.

At step 404 the server 102 receives an input source language text segment and corresponding input context information metadata from the user device 104.

At step 406 the server 102 searches for groups of translation elements for which a numerical match between the input context information metadata, and the source context information metadata of the groups, fulfils a second predetermined criterion. Next, the server 102 searches within these groups for translation elements for which a match between the input text segment and the source text segment fulfils a first predetermined criterion. Finally, the server 102 selects translation elements for which an aggregation of the second predetermined criterion and the first predetermined criterion fulfils a third predetermined.

At step 408 the server 102 modifies the parameters of the generic NMT model using the selected translation elements, to thereby generate an adapted NMT model. The modification step is done according to hyperparameters. The hyperparameters define the number of iterations performed when modifying the generic NMT model, and the learning rate of the modification. These hyperparameters are exaggerated proportionately to the level of match indicated by the third predetermined criterion, so that the modification of the NMT model is more exaggerated if the match with the selected translation elements is strong. In effect, the adapted NMT model is therefore more specialized to the context of the input language text document in cases where very strong matches are found in the translation memory.

At step 410 the server 102 calculates an estimated translation of the input source language text segment into the target language using the adapted NMT model.

At step 412 the server 102 sends the estimated translation to the user device 104.

At step 414 the server 102 receives a new translation element from the user device, the new translation element comprising the input source language text segment as the source language text segment of the translation element; the corrected translation as the target language text segment of the translation element; and the input context information metadata as the source language text segment of the translation element.

At step 416 the server 104 saves the new translation element to the translation memory. As discussed above, the new translation element is stored/indexed so as to be included in each translation memory group corresponding to a translation sub-memory group that was leveraged when calculating the estimated translation.

The NMT calculation and NMT adaptation used in the present disclosure will now be described.

The NMT model used may be based on the NMT approach proposed in Dzmitry Bandanau, Kyunghyun Cho, and Yoshua Bengio. 2014. Neural machine translation by jointly learning to align and translate. arXiv preprint arXiv:1409.0473, the contents of which is incorporated herein by reference. However, as the skilled person will appreciate, the methods and systems disclosed herein can be applied to any NMT model.

For example, in one embodiment, the NMT approach of "Attention Is All You Need", Vaswani Ashish et al., 31st Conference on Neural Information Processing Systems (NIPS 2017)—the contents of which is incorporated herein by reference—may be used.

The encoder and decoder networks discussed below may be implemented with gated recurrent units, as proposed in Kyunghyun Cho, Bart van Merrienboer, C, aglar Gulc,ehre, Fethi Bougares, Holger Schwenk, and Yoshua Bengio. 2014. Learning phrase representations using RNN encoder-decoder for statistical machine translation. CoRR abs/1406.1078, the contents of which are incorporated herein by reference.

The NMT model uses a two-step process to calculate an estimated translation into the target language from an input source language text segment: first, a recurrent neural network encodes the input source language text segment word by word into a sequence of hidden states; then, another recurrent neural network decodes the source hidden sequence into the estimated translation. Both the encoder and decoder networks are implemented with gated recurrent units. In particular, the decoder network operates like a language model: it predicts the next target word from the last target word, the last hidden state of the decoder, and a convex combination of the encoder hidden states. The weights of this convex combination are dynamically computed through a simple feed-forward network, called attention model. Intuitively, similarly to a word alignment model, the attention model informs the decoder about the encoder hidden states corresponding to the next target word. The decoder actually predicts a full distribution over the target language vocabulary. Thus, the calculation of the estimated translation requires sampling at each step the most probable target word from the distribution and then feeding it back to the decoder as input for the next step. The decoding phase is initialised with a conventional delimiter symbol and terminates when the same symbol is output. Better estimated translations are actually produced by integrating the decoder generative process with a beam search, that considers multiple input and output word hypotheses at each step. Training of the NMT model involves estimating many parameters, such as word embedding matrices, GRU layers in both the encoder and decoder networks, and the attention model weights. Training is carried out via maximum-likelihood estimation over a large collection of parallel sentences. In particular, optimization is performed via stochastic gradient descent (SGD), by iterating over batches of training data randomly shuffled after each epoch. More formally, starting from a random initialisation of the parameters, at each iteration a batch B is extracted and each parameter w is moved one step in the opposite direction of the mean gradient of the log-likelihood (L), evaluated on the entries of B:

$$\Delta w = -\eta \frac{1}{|B|} \sum_{(s,t) \in B} \frac{\partial L(s, t)}{\partial w} \tag{1}$$

The size of the step $\Delta w$ is moderated by a learning rate n which can either be fixed for all parameters and all iterations, or vary along one or both dimensions. During training, the SGD procedure typically goes through several so-called epochs, i.e. the number of times the whole training data is processed. The above presented training procedure can also be used to adapt a generic NMT model to a new task for which representative training data is available, i.e. to produce an adapted NMT model.

The step of generating the adapted NMT model from the generic NMT model will now be described. Starting from the generic NMT model ($M_g$), the translation elements of the translation memory (CO and the input source language text segment (q), the following three steps are performed:

1. The input q is used to retrieve from the translation memory a plurality of training elements ($C_q$) for which a match with the input q fulfils a predetermined criterion;
2. The plurality of training elements ($C_q$) are used to modify the hyperparameters ($HP_q$) and to adapt the generic model of $M_g$;
3. The resulting adapted NMT model ($M_q$) is applied to calculate an estimated translation of q. If no matching translation elements are found, the generic NMT model is used to translate q. The pseudo code of this approach is shown in Algorithm 1 below.

```
Algorithm 1 RetrieveAdaptTranslate

1:         ▶ M_g: generic NMT model
 2:         ▶ S: stream of sentences to be translated
 3:         ▶ RT: text retrieval module
 4:         ▶ C_q: retrieved parallel sentences
 5:         ▶ q*: translated segment
 6:         procedure RAT (Mg, RT, S)
 7:             ▶ For each segment to be translated
 8:             while pop q from S do
 9:                 ▶ Local copy of the generic model
10:                 M_q := M_g
11:                 ▶ Instance selection
12:                 C_q := Retrieve (RT, q)
13:                 if C_q ≠ 0 then
14:                     ▶ Model optimization
15:                     HP_q := SetHP (C_q, q)
16:                     M_q := Adapt (M_g, C_q, HP_q)
17:                 ▶ Translate the segment with M_q
18:                 q* := Translate (Mq, q)
19:                 ▶ Post the translated segment
20:                 Post q*
```

Instance selection and hyperparameter optimization are the two key steps of this algorithm. On one hand, since instance selection aims to retrieve the most relevant translation elements from the translation memory, the similarity measure plays an important role as the quality of the material used for modifying the model parameters directly affects the next processing steps. In one example, Lucene, an open-source information retrieval library that is highly optimized for text search purposes, is used to perform the search. However, since the similarity measure used in Lucene is based on tf-idf counts, it does not consider the order of words and n-grams in the query and in the retrieved translation elements, which is an important aspect for NMT model training. In order to take advantage also of the translation memory data, Lucene is first queried to retrieve a large set of candidate translation elements and then re-score them using sentence-level BLEU (Boxing Chen and Colin Cherry. 2014. A systematic comparison of smoothing techniques for sentence-level BLEU. In Proceedings of the Ninth Workshop on Statistical Machine Translation, WMT@ACL 2014, Jun. 26-27, 2014, Baltimore, Md., USA. pages 362-367, which is incorporated herein by reference), so that translation elements with higher BLEU score are ranked first. Finally, the top-n similar translation elements are selected as fulfilling the predetermined criterion (i.e. selected for use in modifying the parameters of the generic NMT model, to thereby generate the adapted NMT model). This approach is reasonably fast, since it takes advantage of Lucene in searching in a large number of translation elements and then computes the BLEU scores on just few candidates.

In some examples, the optimization phase effectively adapts the generic NMT model parameters with a very small set of training elements featuring different levels of similarity. In order to tune at best its parameters with respect to the input source language text segment q, the system has in fact to learn as much as possible from highly similar retrieved/selected translation elements, while minimising the risk of overfitting. The learning rate and number of times the system iterates over the selected training elements hence become crucial aspects during optimization.

In some examples, a simple yet effective method that dynamically decides about the hyperparameters the adapted NMT model (i.e. $HP_q$) based on the relevance of the selected translation elements to the input source language text segment. To this aim, two functions are defined that for the selected translation elements with high similarity to the input source language text segment increase the learning rate and number of epochs, so that the system can leverage more the information of the training set and vice versa. The idea is to overfit more the NMT system on sentences that are similar to the input source language text segment while avoiding drastic changes in case of tuning with low similarity sentence pairs.

Variations and modifications will be apparent to the skilled person. Such variations and modifications may involve equivalent and other features which are already known and which may be used instead of, or in addition to, features described herein. Features that are described in the context of separate examples may be provided in combination in a single embodiment. Conversely, features which are described in the context of a single example may be also provided separately or in any suitable sub-combination.

EXPERIMENTAL SETUP

Data

Experiments have been carried out on an English to French translation task, where the translation elements are a collection of publicly available corpora from different domains: European Central Bank (ECB), Gnome, JRC-Acquis (JRC), KDE4, OpenOffice (OOffice), PHP, Ubuntu, and translated UN documents (UN-TM).2 Since the size of these corpora is relatively small for training robust MT systems, in particular NMT solutions, we added the News Commentary data from WMT'133 (WMT nc), as well as the CommonCrawl (CommonC.) and Europarl corpora as out-domain data, so to reach a total of ~5.8M sentence pairs.

From each specific domain a set of size 500 sentence pairs is randomly selected as development set, and 1,000 sentence pairs are used as held-out test corpus. Duplicated sentence pairs are removed from each corpus separately, resulting in a total of 3,527 dev and 6,962 test corpora for all the domains. To analyze the performance of the system on generic data, two subsets of size 500 and 1000 sentence pairs are randomly selected from the WMT'13 test data as dev and test corpora. The statistics of the training and test corpora are reported in Tables 1 and 2, respectively, showing that the considered domains are extremely diverse in terms of average sentence length and average word frequency. The Avg. Sim column in Table 2 reports the average similarity of the test sentences and the source side of the most relevant sentence pair retrieved from the pool of training data. The scores are computed using the sentence-level BLEU. Since the used adaptation approach updates the model by leveraging these retrieved sentences, their average similarity can be a reliable indicator for predicting the performance gain after adaptation. In other words, the system can learn more from the retrieved samples in the case of corpora with higher sentence similarity (e.g. Gnome) than the datasets with lower average BLEU score (e.g. WMT).

TABLE 1

Statistics of the English side of training corpora.

|  | Segments | Tok/Typ | Avg. Len |
|---|---|---|---|
| ECB | 142.1K | 76.7 | 20.5 |
| Gnome | 236.1K | 102.1 | 7.2 |
| JRC | 678.9K | 146.3 | 15.4 |
| KDE4 | 160.7K | 25.3 | 6.4 |
| OOffice | 32.9K | 40.8 | 11.2 |
| PHP | 36.7K | 26.0 | 6.5 |

TABLE 1-continued

Statistics of the English side of training corpora.

|  | Segments | Tok/Typ | Avg. Len |
|---|---|---|---|
| Ubuntu | 7.5K | 5.1 | 5.2 |
| UN-TM | 37.6K | 69.6 | 21.9 |
| WMT_nc | 189.1K | 65.3 | 24.6 |
| CommonC. | 2.6M | 80.3 | 20.9 |
| Europarl | 1.7M | 364.3 | 22.9 |

TABLE 2

Statistics of the English side of the test corpora.

|  | Segments | Tok/Typ | Avg. Sim |
|---|---|---|---|
| ECB | 1,000 | 5.5 | 50.5 |
| Gnome | 982 | 3.8 | 70.2 |
| JRC | 757 | 5.1 | 54.7 |
| KDE4 | 988 | 7.0 | 34.8 |
| OOffice | 976 | 5.8 | 30.3 |
| PHP | 352 | 4.1 | 55.7 |
| Ubuntu | 997 | 2.7 | 27.4 |
| UN-TM | 910 | 7.1 | 65.1 |
| WMT | 1,000 | 2.2 | 11.9 |

Finally, the analysis of the characteristics of Gnome, KDE4, OpenOffice, PHP, and Ubuntu, which are often referred to as IT domain corpora, evidences another important issue in developing domain-specific MT systems. As the statistics of Table 1 show, these corpora are extremely diverse in terms of average sentence length and word frequency, which are likely to correspond to different levels of difficulty for MT and, in turn, to large differences in final translation quality.

NMT System

All experiments with NMT are conducted with an in-house developed and maintained branch of the Nematus toolkit which is an implementation of the attentional encoder-decoder architecture (Bandanau et al., 2014). In order to increase the consistency in segmenting the source and target text, both sides of the training data are combined, and the number of merge rules is set to 89,500, resulting in vocabularies of size 78K and 86K tokens respectively for English and French. Mini-batches of size 100, word embeddings of size 500, and GRU layers of size 1,024 are used. The maximum sentence length is set to 50. The models are trained by reshuffling the training set at each epoch, and are evaluated every 10,000 mini-batches.

Terms of Comparison

The adaptive NMT system of the present disclosure is compared with a generic NMT and a strong PBMT system trained on the pool of all the training data. In Table 3, the results on the dev set are reported. Although trained on the same dataset, it is interesting to note that, the performance of the generic NMT system is by far lower than the PBMT system. A possible explanation is that the PBMT system can explicitly memorise and use translation options learned from the training data, while the NMT system generates a more implicit representation of the data.

TABLE 3

Comparison of the performance of generic PBMT, domain-specific oracles, and the adaptive NMT systems on the dev corpora in terms of BLEU

|  |  | NMT | | | Adaptive | | |
|---|---|---|---|---|---|---|---|
|  | PBMT | Generic | Oracle | Li et al. | Base-line | Dynamic Lrate | Dynamic Lrate-Epochs |
| Overall | 54.6 | 45.7 | 55.9 | 53.2 | 53.2 | 53.6 | 57.5 |
| ECB | 56.1 | 46.3 | 56.3 | 50.9 | 51.1 | 51.0 | 53.7 |
| Gnome | 88.1 | 62.3 | 90.5 | 75.2 | 74.6 | 79.0 | 91.2 |
| JRC | 65.7 | 59.9 | 64.7 | 67.3 | 66.6 | 66.8 | 70.2 |
| KDE4 | 50.1 | 45.7 | 54.3 | 50.5 | 50.4 | 50.4 | 53.1 |
| OOffice | 37.5 | 32.0 | 41.5 | 35.7 | 36.5 | 36.2 | 39.3 |
| PHP | 46.6 | 29.7 | 39.3 | 37.1 | 39.8 | 39.6 | 48.0 |
| Ubuntu | 50.1 | 47.9 | 47.7 | 49.1 | 49.5 | 51.5 | 53.1 |
| UN-TM | 72.8 | 54.4 | 78.4 | 70.0 | 70.3 | 70.3 | 77.6 |
| WMT | 26.7 | 30.5 | 26.8 | 29.0 | 29.7 | 30.6 | 30.3 |

In order to improve the performance of the generic NMT system on the target domains, we separately adapted multiple instances of the generic NMT model to each specific domain (using only the corresponding training data). This is done by using the same configurations and training criteria used for the generic model. These strong systems are referred to as oracles, because they exploit knowledge of the domain labels both at the training and test time. As can be seen in Table 3, this offline adaptation significantly improves the performance of the NMT system, resulting in translations with higher quality than the strong PBMT system.

For efficiency reasons, in all our experiments we use only the first best sentence pair (translation element) for updating the model is kept.

Unsupervised NMT Adaptation: Learning Rate

Figure 5:
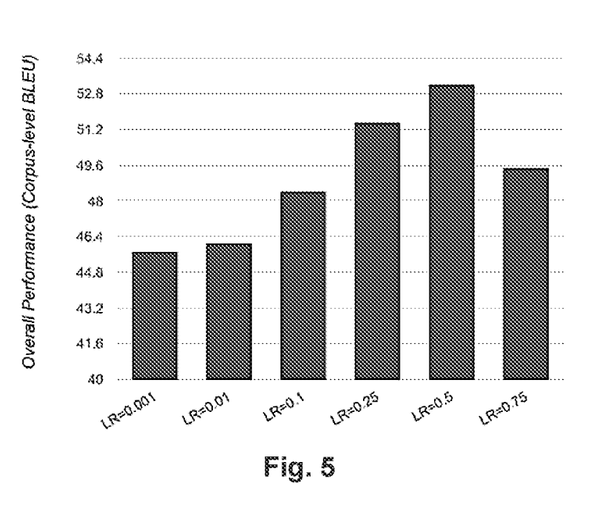
FIG. 5 is a graph showing learning rate and overall performance for adapted NMT models according to the present disclosure.

Once a set of relevant sentence pairs (translation elements) is selected/extracted from the translation memory, the generic NMT must be adapted using these selected translation elements. The learning rate controls the contribution of the new information for updating the model parameters by determining the magnitude of the update steps. Deciding about the learning rate value is very important for the SGD algorithm in general, but becomes even more crucial in scenarios where it is required to adjust the parameters by using only a small number of translation elements. In order to approximate the optimal value, a set of experiments are performed on a dev set in which the learning rate is gradually increased until the overall performance of the system starts to degrade (FIG. 5).

However, if the similarity between the selected translation element and the test sentence (i.e. input source language text segment) is low, by applying larger learning rates a risk is run of making drastic parameter changes in the wrong direction, which can result in lower quality translations and global performance degradations. The low results of the system when using learning rate of 0.75 empirically confirms this.

Figure 6:
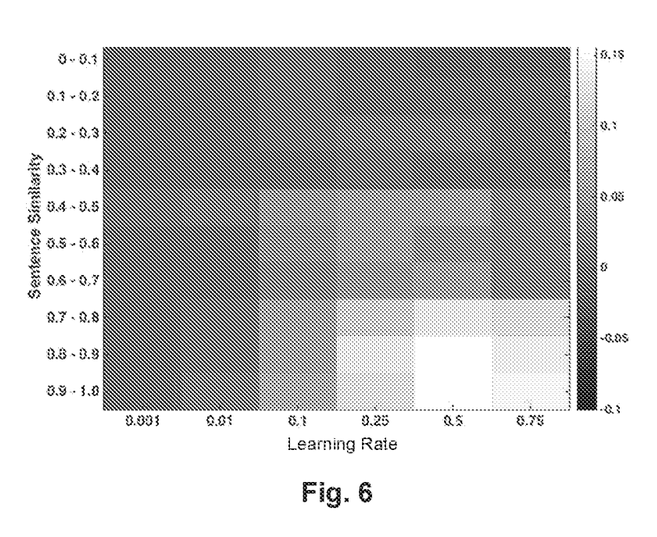
FIG. 6 is a graph showing adapted NMT model performance at varying learning rates and translation element similarities.

To further analyze the effect of different learning rates on sentences with different levels of similarity, the average performance gain of the adaptive system (over generic NMT in terms of sentence-level BLEU) is measured in each similarity range when using different learning rates (FIG. 6). The brighter cells correspond to the configurations where the performance of the adaptive NMT model over an unadapted generic NMT model is significantly higher.

By applying more conservative learning rates to less relevant training samples, while increasing it to larger values for higher similarity levels, the inventors have found it is also possible to improve performance with less relevant samples results. Based on this analysis, they developed a dynamic learning rate method that, for each similarity range in FIG. 6, selects the learning rate that provides the largest gain over the generic NMT model (i.e. Adaptive Dynamic-Learn rate). For instance, it uses the learning rate of 0.01 for the sentences in the similarity range of [0.0-0.1], and sets the learning rate to 0.5 for the samples with the similarity between 0.9 and 1.0. The results of this system are reported in Table 3. By comparing these results against the best performing system with fixed learning rate (i.e. Adaptive Baseline), we see that dynamically setting the learning rate improves the performance by +0.4 BLEU points in overall (53.6 vs 53.2), which further reduces the gap between the generic and adapted NMT approaches.

Unsupervised NMT Adaptation: Number of Epochs

During training/adaptation the training samples are processed iteratively and the network parameters are updated accordingly. The number of epochs plays an important role in this process. Setting it to a large value may result in overfitting, which limits the generalization capability of the model, while performing only few epochs results in underfitting, where the system does not learn effectively from the samples. In order to analyze the effect of this factor on the final performance of the system, the inventors run another set of experiments in which the maximum number of epochs is gradually increased until the overall results start to degrade. In these experiments we used the dynamic learning rates described above. We observed that increasing the maximum number of epochs up to 9 helps to improve the overall performance of the system, while using larger number of updates leads in performance degradation due to the aforementioned overfitting issue.

Similarly to the experiments above, the relation between the number of epochs and the sentence similarity is first explored and, then, it is used to devise an approach that can automatically set the number of updates. This analysis suggests to set the number of epochs proportional to the level of similarity of the training instance.

The results of our adaptive system using dynamic learning rate and number of epochs (i.e. Adaptive Dynamic Lrate-Epochs) on the dev set are reported in Table 3. As the results show, dynamically deciding about the number of epochs improves the performance of the system by +3.9 BLEU scores, outperforming all our adaptive systems by a large margin. More detailed analysis of the system shows that dynamically setting the number of epochs is in particular beneficial for the domains with high similarity, where it allows the system to leverage more the information of the training sample by performing more updates. In fact, the significant improvements over Adaptive Dynamic Learn rate in the domains with high sentence similarities (e.g. +12.2 in case of Gnome and +7.4 in case of UN-TM) and the smaller gains in the domains with low similarities (e.g. +1.7 in case of Ubuntu) empirically proves this. The investigation into the correlation of the performance gain by the adaptive system and similarity of the retrieved sentence, shows that there is a correlation of 0.9 between these two factors, further supporting the domain-wise analysis.

The results of the experiments on the test set are reported in Table 4 and show that the adaptive NMT system outperforms non-adaptive generic NMT systems and both the strong PBMT system and domain-specific oracles by a large margin (+14.5, +3.9 and +2.8). This confirms that adapting the generic NMT models to small set of relevant training samples can effectively improve the final performance of the system, making it a reasonable solution for the multi-domain application scenarios where maintaining several domain-specific MT engines is not feasible.

TABLE 4

Comparison of the generic PBMT, NMT and domain-specific NMT oracles against the adaptive system with dynamic learning rate and dynamic number of epochs. The reported BLEU scores are computed on the test corpora.

|  | PBMT | NMT Generic | NMT Oracle | Adaptive Lrate-Epochs |
|---|---|---|---|---|
| Overall | 54.5 | 44.9 | 55.6 | 58.4 |
| ECB | 58.6 | 46.5 | 58.0 | 58.7 |
| Gnome | 90.5 | 61.5 | 93.8 | 94.9 |
| JRC | 66.3 | 56.5 | 62.6 | 69.7 |
| KDE4 | 50.6 | 46.4 | 55.7 | 56.2 |
| OOffice | 37.1 | 31.8 | 39.9 | 40.3 |
| PHP | 47.0 | 33.4 | 39.7 | 50.5 |
| Ubuntu | 45.8 | 45.3 | 46.9 | 48.8 |
| UN-TM | 69.7 | 52.1 | 75.7 | 75.9 |
| WMT | 26.0 | 30.7 | 26.6 | 30.7 |

The invention claimed is:

1. A method of calculating an estimated translation from a source language to a target language, the method comprising:
   receiving an input text segment and input context information indicative of circumstances in which the input text segment is used, the input text segment being in the source language;
   calculating an estimated translation of the input text segment into the target language using a generic model for providing a generalised machine translation from the source language to the target language, and a translation memory comprising translation elements for modifying the generic model; each translation element comprising a source language text segment, a corresponding target language text segment, and corresponding source context information indicative of circumstances in which the source text segment is used;
   providing the estimated translation to a user, for correction by the user; and
   updating the translation memory by storing the input text segment, the corrected translation, and the input context information, as a new translation element in the translation memory;
   wherein calculating the estimated translation of the input text segment into the target language includes modifying the generic model to produce an adapted model, wherein the modifying is done using at least one translation element selected from the translation memory based at least in part on a match between the input text segment and the source language text segment of each of the one or more selected translation element(s) fulfilling a first predetermined criterion, and wherein adapted model is used to calculate the estimated translation.

2. The method of claim 1, wherein at least some of the source/input context information is indicative of one or more of dialect, discourse, lexicon, and subject matter of the source/input text segment.

3. The method of claim 2, wherein at least some of the source/input context information comprises metadata indicative of one or more of dialect, discourse, lexicon, and subject matter of the source/input text segment.

4. The method of claim 1, wherein the at least one translation element is further selected based on:
   a match between the input context information and the source context information of the selected translation element(s) fulfilling a second predetermined criterion.

5. The method of claim 4, wherein generating the adapted model comprises modifying parameters of the generic model using the one or more selected translation element(s).

6. The method of claim 1, wherein the input text segment, input context information and corrected translation are received from a user device associated with the user;
   the input context information extracted, by the user device, from the input text segment or from an input document to which the input text segment belongs.

7. The method of claim 1, wherein the translation memory is further updated with translation elements from a translation sub-memory associated with a user device, the user device associated with the user.

8. A computer-readable storage medium comprising instructions which, when executed by a computer, cause the computer to carry out the method according to claim 1.

9. A server programmed and operable to carry out the method according to claim 1.

10. A system for calculating an estimated translation from a source language to a target language, the system comprising:
    a generic model for providing a generalised machine translation from the source language to the target language; and
    a translation memory comprising translation elements for modifying the generic model, each translation element comprising a source language text segment, a corresponding target language text segment, and corresponding source context information indicative of circumstances in which the source text segment is used;
    the system configured to:
    receive an input text segment and input context information indicative of circumstances in which the input text segment is used, the input text segment being in the source language;
    calculate an estimated translation of the input text segment into the target language using the generic model and the translation memory;
    provide the estimated translation to a user, for correction by the user; and
    store the input text segment, the corrected translation, and the input context information, as a new translation element in the translation memory, thereby updating the translation memory;
    wherein calculating the estimated translation of the input text segment into the target language includes modifying the generic model to produce an adapted model, wherein the modifying is done using at least one translation element selected from the translation memory based at least in part on a match between the input text segment and the source language text segment of each of the one or more selected translation element(s) fulfilling a first predetermined criterion, and wherein adapted model is used to calculate the estimated translation.

11. The system of claim 10, wherein at least some of the source/input context information is indicative of one or more of dialect, discourse, lexicon, and subject matter of the source/input text segment.

12. The system of claim 10, wherein at least some of the source/input context information comprises metadata indicative of one or more of dialect, discourse, lexicon, and subject matter of the source/input text segment.

13. The system of claim 10, wherein:
    a match between the input context information and the source context information of the one or more selected translation element(s) fulfilling a second predetermined criterion.

14. The system of claim 13, wherein generating the adapted model comprises modifying parameters of the generic model using the one or more selected translation element(s).

15. The system of claim 10, comprising:
    a server comprising a processor and server storage device; and
    a user device in communication with the server, from which the user interacts with the system;
    wherein the server storage device has stored thereon the generic model and the translation memory.

16. The system of claim 15 wherein:
    the user device is configured to receive the input text segment, extract the input context information from the input text segment or from an input document to which the input text segment belongs, and forward the input text segment and input context information to the server;
    the processor is configured to calculate the estimated translation and forward the estimated translation to the user device;
    after the estimated translation has been corrected by the user, the user device is further configured to forward the corrected translation to the server; and
    the processor is configured to store the input text segment, the corrected translation, and the input context information, as a new translation element in the translation memory of the server storage device.

17. The system of claim 15, wherein the user device includes a user storage device having stored thereon a translation sub-memory associated with the user device, the translation sub-memory comprising translation elements.

18. The system of claim 17, wherein the user device is configured to forward translation elements of the translation sub-memory to the user device; and
    the processor is configured to update the translation memory on the server storage device with translation elements of the translation sub-memory received from the user device.

19. The system of claim 16, wherein the system comprises a plurality of user devices, each in communication with the server;
    wherein each user device is configured to forward a respective input text segment, corresponding input context information and corresponding corrected translation to the server; and
    the processor is configured to forward a respective estimated translation to each user device.

* * * * *